United States Patent [19]

Skafvenstedt et al.

[11] 4,348,118
[45] Sep. 7, 1982

[54] PAPER TRANSPORT MEANS FOR A RECORDING DEVICE

[75] Inventors: Bengt Skafvenstedt, Stockholm; Sture Ahlgren, Vällingby, both of Sweden

[73] Assignee: Siemens Aktiengesellschaft, Berlin & Munich, Fed. Rep. of Germany

[21] Appl. No.: 245,915

[22] Filed: Mar. 20, 1981

[30] Foreign Application Priority Data

Apr. 11, 1980 [DE] Fed. Rep. of Germany ....... 3014043

[51] Int. Cl.³ .............................................. B41J 29/38
[52] U.S. Cl. ..................................... 400/54; 400/708; 346/136
[58] Field of Search ..................... 400/54, 126, 708; 346/136, 28; 226/24, 33, 45

[56] References Cited

U.S. PATENT DOCUMENTS

| | | | |
|---|---|---|---|
| 3,605,111 | 9/1971 | Schmoll | 346/136 X |
| 3,945,022 | 3/1976 | Distler | 400/126 |
| 4,165,029 | 8/1979 | Mitchell | 346/136 X |
| 4,215,351 | 7/1980 | Lowe | 346/136 |
| 4,239,404 | 12/1980 | Defilipps et al. | 400/708 |
| 4,283,732 | 8/1981 | Akitomo et al. | 346/136 X |
| 4,296,420 | 10/1981 | Dambach et al. | 346/136 X |

FOREIGN PATENT DOCUMENTS

| | | | |
|---|---|---|---|
| 2525263 | 10/1976 | Fed. Rep. of Germany | 400/54 |
| 2845221 | 4/1980 | Fed. Rep. of Germany | 346/136 |
| 55-32603 | 3/1980 | Japan | 400/54 |
| 55-49784 | 4/1980 | Japan | 400/54 |

OTHER PUBLICATIONS

"Mingograf 34", Siemens Booklet No. ME114/5562.101, pp. 1-12, Nov. 1979.

Primary Examiner—E. H. Eickholt
Attorney, Agent, or Firm—Hill, Van Santen, Steadman, Chiara & Simpson

[57] ABSTRACT

In an exemplary embodiment, the recording paper is transported by at least one drive capstan driven by a motor across a writing surface at which a fluid writer is disposed for writing. The object of the disclosure is to create a paper transport system which always avoids unnecessary contaminations due to writing fluid with certainty. This object is achieved in that the motor-driven drive capstan has a no-load indicator allocated to it which identifies no-load operation of the drive capstan and generates a shut-down signal for the fluid jet writer.

6 Claims, 5 Drawing Figures

PAPER TRANSPORT MEANS FOR A RECORDING DEVICE

BACKGROUND OF THE INVENTION

The invention relates to a paper transport means for a recording device with a location for the unwritten recording paper, at least one drive capstan driven by a motor and if required further guide rollers for the transport of the paper across a writing surface at which a fluid writer is disposed for writing.

A paper transport means of this type is known from the Siemens brochure "Mingograf 34". A characteristic of said paper transport means is that the fluid jet writer continues to eject writing fluid when the supply of recording paper has been exhausted insofar as this is not perceived by an operator at the proper time and a response made by shutting down the device.

SUMMARY OF THE INVENTION

The object of the invention is to create a paper transport means which always avoids unnecessary contamination due to writing fluid with certainty.

The object is inventively achieved in that the motor-driven drive capstan has a no-load indicator allocated to it which identifies a no-load of the drive capstan and generates a shut down signal for the fluid jet writer.

When the recording paper is used up, the transport roller which is not shut down is transferred into no-load operation. Said no-load operation is inventively perceived and the response is the automatic shut down of the liquid jet writer. The danger that the recording device will be contaminated due to ejection of writing fluid after the withdrawal of the paper is thus eliminated.

Further advantages and details of the invention derive from the following description of an exemplary embodiment on the basis of the drawing in conjunction with the subclaims; and other objects, features and advantages will be apparent from this detailed disclosure and from the appended claims.

DETAILED DESCRIPTION

Figure 1:
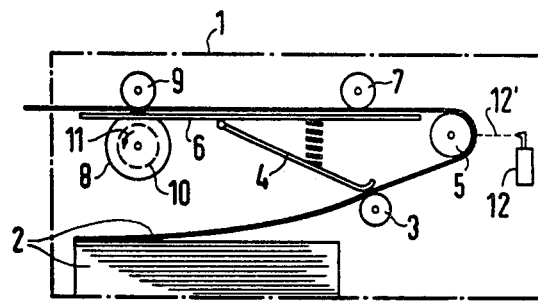
FIG. 1 shows schematically the structure of a paper transport means according to the invention.

In FIG. 1, a recording device 1 is loaded with a stack of recording paper 2. In the transport direction from the stack of writing paper, the paper 2 is first conducted across a brake roller 3. A pressure piece 4 is resiliently urged to press the paper against the brake roller 3. Due to said braking mechanism, the paper 2 is held taut on a recording support 6 between the braking roller 3 and further, following rollers 5, 7, 8, 9. The roller 5 is a forming roller at the writing station whereas the roller 7 above the recording support 6 is a blotter roller 7 which serves for drying the recording on the intervening paper. The roller 8, finally, together with the resiliently pressed counterpressure roller 9 serves as a drive capstan for the paper 2. It is rotated in the direction of arrow 11 by means of a motor 10.

The recording ensues by means of the ink jet 12' of an ink jet writer 12 in the area of the forming roller 5.

Figure 2:
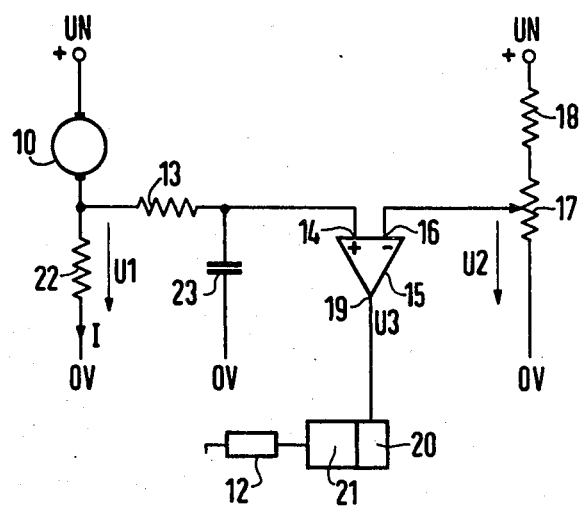
FIG. 2 is a basic circuit diagram of the shut down control.

In the basic circuit diagram of FIG. 2, the motor 10 for the drive capstan 8 is connected via a low pass filter constructed of a resistor 13 and a capacitor 23 to the positive input 14 of a comparator 15. The negative input 16 of the comparator 15 is connected to the tap of a potentiometer 17 whose main terminals are energized via a series resistor 18. The output 19 of the comparator 15 is connected to a valve 20 of a pump system 21 for the writing ink of the jet writer 12. Given a positive output voltage U3 of the comparator 15, the valve 20 is opened for the supply of ink to the jet writer 12. Given a negative output voltage U3 of the comparator 15, on the other hand, the valve 20 is closed and the jet writer stops ejecting ink.

The manner of functioning of the basic circuit diagram of FIG. 2 is as follows:

The current I fed in from the mains UN to the motor 10 generates a voltage U1 at the resistor 22, said voltage being supplied to the positive input 14 of the comparator 13 via the low pass filter 13, 23. A voltage U2 lies at the negative input 16 of the comparator 15, said voltage U2 being derived via the resistor 18 at the tap of the potentiometer 17 from the mains line UN.

The tap of the potentiometer 17 is set in such manner that the voltage U2 is greater than zero volts. When the motor 10 is shut down, the current I=0 and, accordingly, the voltage U1 across the resistor 22 also equals zero volts (0V). Thus, U1 is less than U2 and U3 is less than zero volts. The valve 20 remains closed. Given no-load operation of the motor 10, U1 is also less than U2, given a corresponding setting of the potentiometer 17. The valve 20, thus, is also closed for this operating case.

If, on the other hand, the motor 10 is now loaded, i.e. when the drive capstan 8 pulls the recording paper, then the current I rises and, thus, so does the voltage U1. The voltage U1 supplied to the comparator 15 via the positive input 14 now becomes greater than the voltage U2 conducted via the negative input 16. The output voltage U3 becomes positive; the valve 20 opens and the writer 12 writes.

According to the invention, however, the writing operation is abruptly interrupted at the moment at which the trailing end of recording paper 2 leaves the braking roller 3. The motor is now running in no-load operation. The current I and, thus, the voltage U1 drop. The comparator 15 registers the no-load operation and reacts with an output signal U3 less than zero volts. The valve 20 closes and the writing operation is interrupted.

Figure 3:
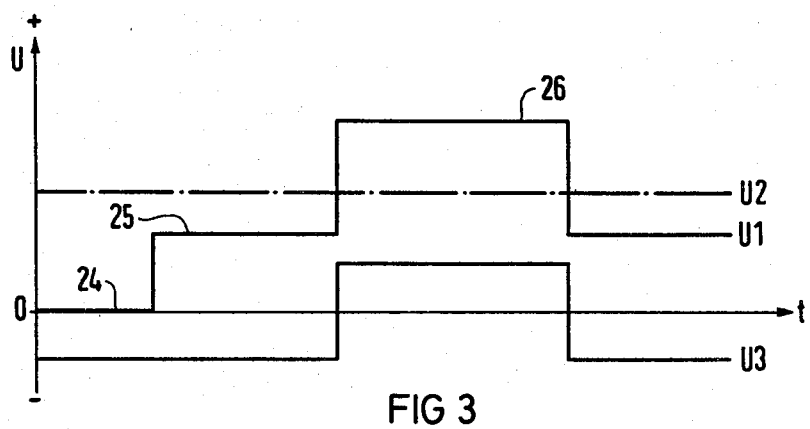
FIG. 3 is a diagram showing the essential signal voltage waveforms.

FIG. 3 shows a possibility for a setting of the voltage U2 at the potentiometer 17 as a function of the voltages U1 and U3. The voltage U1 varies as a function of the load of the motor 10 in stages 24, 25, 26. In stage 24, the motor 10 is shut off. The stage 25 shows the no-load operation; here, U1 is still less than U2. The output voltage U3 of the comparator 14 is negative in both cases, i.e. both given a deenergized motor 10 as well as when the motor operates in no-load operation. The voltage U3 is only changed when the motor is loaded. When the motor 10 is operating under load, the voltage U1 proceeds to stage 26; U1 becomes greater than U2 and, thus U3 becomes greater than zero.

Figure 4:
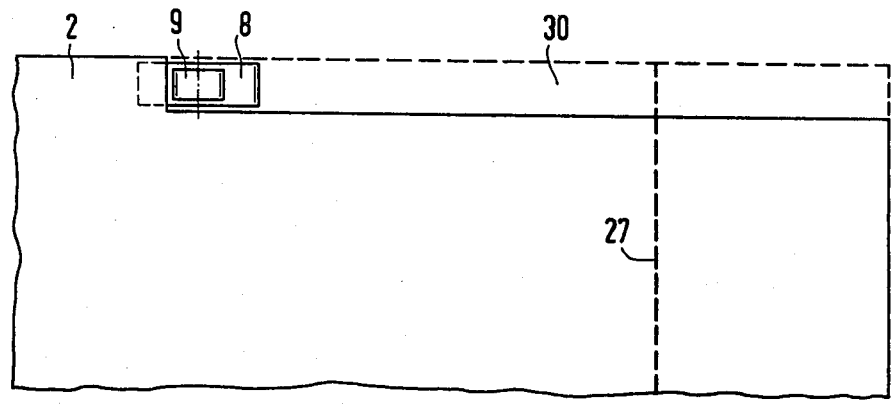
FIGS. 4 and 5 show ends of paper webs specifically designed to promote the shut down operation.

FIG. 4 shows that the recording paper 2 is cut out at the end of the web in such manner that the cut-out part 30 runs free of the drive capstan 8 before the end strip of paper 2 has left the jet area or recording location 27 of the ink jet writer 12. This special design of the recording paper provides a shutdown of the writing operation while the paper end is still taut. The last bit of jetted ink, thus, only strikes paper and not the recording support.

Figure 5:
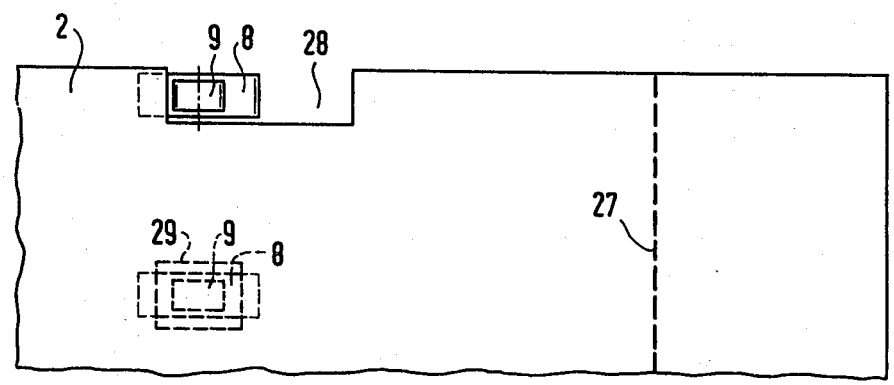

FIG. 5 shows variations in the manner of design as a short cut-out 28 at the edge of the paper or as a hole 29 in the center of the paper track with a drive capstan 8 correspondingly arranged in the center.

It will be apparent that many modifications and variations may be effected without departing from the scope of the novel concepts and teachings of the present invention.

We claim as our invention:

1. A paper transport system for a recording device with a receiving location for the unwritten recording paper and at least one motor-driven drive capstan having a motor for driving the same for the transport of the paper from the receiving location, a recording location at which a fluid jet writer is disposed for writing, characterized in that the motor-driven drive capstan (8) has a no-load indicator (13 through 19, 22, 23) allocated to it which identifies a no-load operation of the drive capstan (8) and generates a shut-down signal for the fluid jet writer (12).

2. A paper transport system according to claim 1, characterized in that the no-load indicator comprises a comparator (15) having first and second inputs, first means for supplying a first signal (U1) at said first input with said first signal increasingly rising in steps with an increasing load of the drive capstan (8) and second means for supplying a second signal (U2) to said second input with said second signal being adjusted in amplitude as a comparison signal in such manner that, in terms of value, it lies between the voltage value of said first signal for no-load operation and the voltage value of said first signal for operating load on the drive capstan.

3. A paper transport system according to claim 2, characterized in that the comparator (15) generates a stop signal for the fluid jet writer (12) when the first signal (U1) indicating the operation condition of the drive capstan (8) falls below said second signal (U2).

4. A paper transport system according to claim 3, characterized in that the comparator (15) generates a start signal for the fluid jet writer (12) when the first signal (U1) exceeds said second signal (U2).

5. A paper transport system according to claim 4, characterized in that a fluid jet writer (12) comprises a controllable valve (20) for the recording fluid, said valve (20) being closed by means of a stop signal of the comparator (15) and being opened by means of a start signal.

6. A paper transport system according to claim 1, characterized in that the recording paper (2) is cut out at the end of its track in such manner that the cut-out part (28,30) proceeds free of the drive capstan (8) before the end of the recording paper (2) has left the recording location (27) of the fluid jet writer (12).

* * * * *